United States Patent [19]

Townsend

[11] Patent Number: 4,606,093
[45] Date of Patent: Aug. 19, 1986

[54] SKINNING BLADE FOR MEAT SKINNING MACHINES

[75] Inventor: Ray T. Townsend, Des Moines, Iowa
[73] Assignee: Townsend Engineering Company, Des Moines, Iowa
[21] Appl. No.: 713,311
[22] Filed: Mar. 18, 1985
[51] Int. Cl.$^4$ .......................... A22B 5/16; A22C 17/12
[52] U.S. Cl. ........................................... 17/21; 99/589
[58] Field of Search .................. 17/21, 50, 62; 99/588, 99/589, 590

[56] References Cited

U.S. PATENT DOCUMENTS

| | | | |
|---|---|---|---|
| 3,164,858 | 1/1965 | De Moss | 17/62 X |
| 3,931,665 | 1/1976 | Townsend | 17/21 |
| 4,203,179 | 5/1980 | Braeger | 17/62 |
| 4,222,152 | 9/1980 | Braeger | 17/62 |
| 4,340,995 | 7/1982 | Braeger | 17/21 X |

*Primary Examiner*—Willie G. Abercrombie
*Attorney, Agent, or Firm*—Zarley, McKee, Thomte, Voorhees & Sease

[57] ABSTRACT

The skinning blade for a meat skinning machine comprises an elongated body member having opposite ends, a top surface, a bottom surface, a leading cutting edge and a trailing edge. The bottom surface includes in cross section a concave surface formed therein, the concave surface having a forward end adjacent the cutting edge and a rearward end spaced forwardly from the trailing edge of the body member. The trailing edge of the cutting blade is adapted to be received by a blade holder, and an extension portion of the cutting blade maintains the holder in spaced relation to the concave surface of the cutting blade.

7 Claims, 4 Drawing Figures

SKINNING BLADE FOR MEAT SKINNING MACHINES

BACKGROUND OF THE INVENTION

This invention relates to a skinning blade for meat skinning machines.

Meat skinning machines presently include a rotatable gripping roll having a plurality of teeth on its outer surface. Mounted in close proximity to the rotating gripping roll is a relatively flat elongated skinning blade which is held by a blade holder. The blade holder includes an arcuate shoe having a concave surface which is adapted to fit in concentric relation to the gripping roll. The arcuate surface of the shoe terminates in a forward leading edge which is spaced slightly behind the cutting edge of the skinning blade. This leading edge tapers to a feather-edge as the lower trailing side of the blade is encountered.

It is difficult to fabricate such an edge, and it is impossible to maintain this edge as the machine is used. As this edge erodes or is otherwise damaged, chips of material are deposited in the crevice left by the eroding edge.

In order to obtain proper severing of the skin from the meat, it is desirable that the pressure shoe provide a constant uniform pressure on the separated skin which is between the pressure shoe and the gripping roll. When the pressure shoe becomes damaged or cut or chipped, this even pressure is hindered, and the skinning operation is not as uniform or as efficient as desired.

Therefore, a primary object of the present invention is the provision of an improved skinning blade for a meat skinning machine.

A further object of the present invention is the provision of a skinning blade including an arcuate surface which takes the place of the pressure shoe previously used with prior art devices.

A further object of the present invention is the provision of a skinning blade having a concave surface which provides improved uniformity of pressure on the skin as it is being severed from the meat.

A further object of the present invention is the provision of a skinning blade which includes an arcuate surface which is remote from the blade holder for the skinning blade so that the blade holder or shoe do not need to be honed to a feather-edge to compliment the shape of the arcuate gripping roll.

A further object of the present invention is the provision of an improved skinning blade having an upwardly beveled surface on its lower surface immediately adjacent the cutting edge so as to facilitate the separation of the skin from the meat and cause the skin to move downwardly, whereas the remainder of the meat will move upwardly above the skinning blade.

A further object of the present invention is the provision of a skinning blade which can easily be mounted or detached from the blade holder.

A further object of the present invention is the provision of an improved skinning blade having an arcuate surface concentric to the gripping roll which provides an improved durability over the previously used pressure shoes.

A further object of the present invention is the provision of an improved blade assembly which minimizes the exposure of sharp edges adjacent the path of the rotating teeth on the gripping roll.

A further object of the present invention is the provision of an improved skinning blade which is economical to manufacture, durable in use, and efficient in operation.

SUMMARY OF THE INVENTION

The skinning blade of the present invention comprises an elongated blade body having opposite ends, a leading cutting edge, a trailing edge, an upper surface and a lower surface. The lower surface has a concave surface shaped to fit in close spaced concentric relation to the arcuate path of the teeth of the gripping roll. The concave surface has a forward end adjacent the cutting edge and a rearward end. The bottom surface of the blade also includes a shank portion adapted to be retentively engaged by a blade holder, and further includes an extension portion which extends forwardly from the shank portion to the rearward end of the concave surface. The extension portion maintains the blade holder in rearward spaced relation to the rearward end of the concave surface so that the blade holder will not be damaged by the rotating teeth of the gripping roll.

The bottom surface of the blade body also includes an upwardly beveled portion which is between the forward end of the concave surface and the cutting edge. This upwardly beveled portion guides the skin of the meat downwardly away from the remainder of the meat and causes the skin to pass between the gripping roll and the blade for severing the skin from the meat.

The skinning blade of the present invention is adapted to be mounted in a blade holder in such a manner that the concave surface of the blade is held in substantially close spaced concentric relation to the circular path of the teeth of the gripping roll. At the same time, the blade holder is positioned remotely from the teeth of the gripping roll so that it will not become damaged.

DETAILED DESCRIPTION OF THE PREFERRED EMBODIMENT

Figure 1:
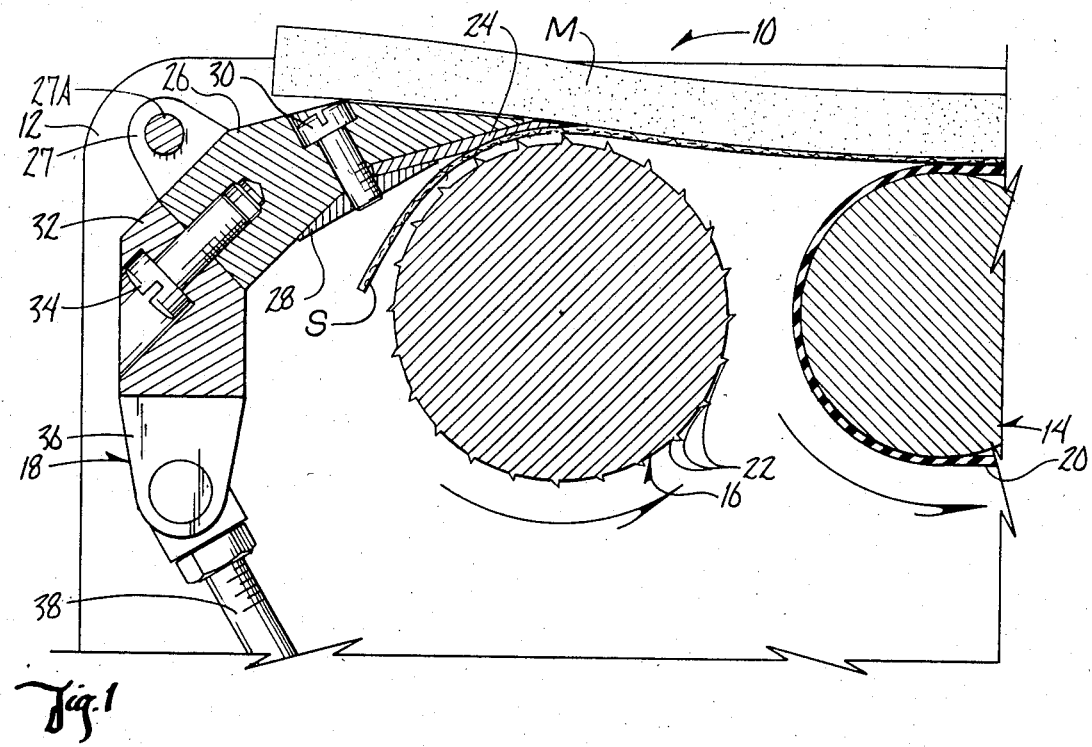
FIG. 1 is a partial sectional view of a skinning machine showing the skinning blade of the present invention therein.
Figures 2, 4:
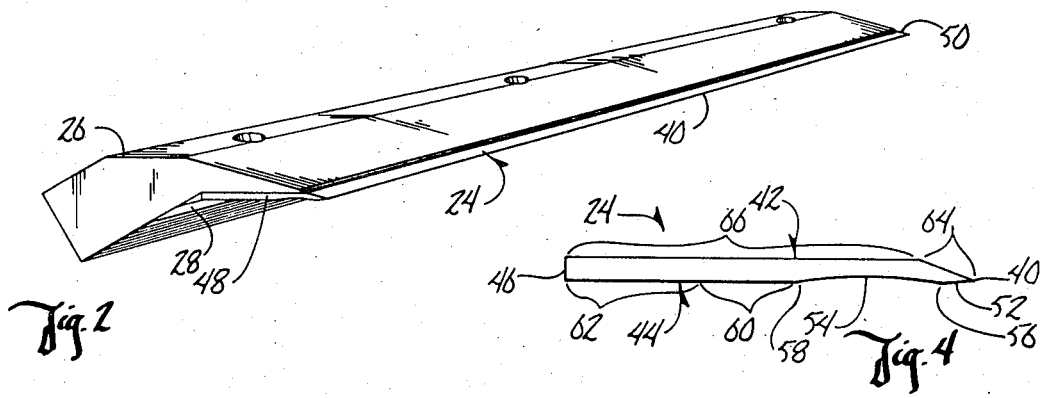
FIG. 2 is a perspective view of the blade holder and the blade.
FIG. 4 is an end view of the blade of the present invention.

The numeral 10 generally designates a meat skinning machine for severing a piece of skin S from meat M. Machine 10 comprises a support frame 12, a conveyor 14, a gripping roll 16 and a blade control assembly 18.

Conveyor 14 includes a conveyor belt 20 which is adapted to carry the piece of meat M towards the gripping roll 16 and the blade control assembly 18 for severing the layer of skin S from meat M.

Gripping roll 16 is a cylindrical roll which is rotatably mounted with respect to frame assembly 12 for rotation about the longitudinal cylindrical axis of roll 16. On the outer surface of cylindrical roll 16 are a plurality of teeth 22 which are adapted to engage the layer of skin S and grip the layer of skin for pulling it toward the blade control assembly 18.

Blade control assembly 18 comprises a skinning blade 24 which is held by an upper blade holder 26 and a lower blade holder 28 which are held together by means of a machine screw 30.

Upper blade holder 26 is connected to a blade control yoke 32 by means of several machine screws 34. Bearings 27 are rigidly secured to blade holder 26 and rotatably embraces shaft 27A which is mounted on frame 12 (only one bearing being shown in the drawings). At opposite ends of blade control yoke 32 are a pair of ears 36 which are pivotally connected to a control rod 38. Control rod 38 is connected to power means (not shown) for controlling the movement of the entire blade control assembly 18 about shaft 27A relative to the gripping roll 16.

The configuration of the meat skinning blade 24 includes a forward cutting edge 40, an upper surface 42, a lower surface 44, a rear edge 46, and opposite ends 48, 50. Lower surface 44 comprises an upwardly beveled portion 52 located immediately adjacent cutting edge 40. Rearwardly from upwardly beveled portion 52 is a concave portion 54 having its forward end 56 adjacent beveled portion 52 and having its rearward end 58 adjacent an extension portion 60. Rearwardly of extension portion 60 is a shank portion 62 which is adapted to be received between upper blade holder 26 and lower blade holder 28. The upper surface 42 of blade 24 comprises a forward portion 64 and a rearward portion 66. Rearward portion 66 of the upper surface 42 is approximately parallel to extension portion 60 and shank portion 62 of bottom surface 44. The forward portion 64 of upper surface 42, however, is beveled downwardly and forwardly toward cutting edge 40.

Figure 3:
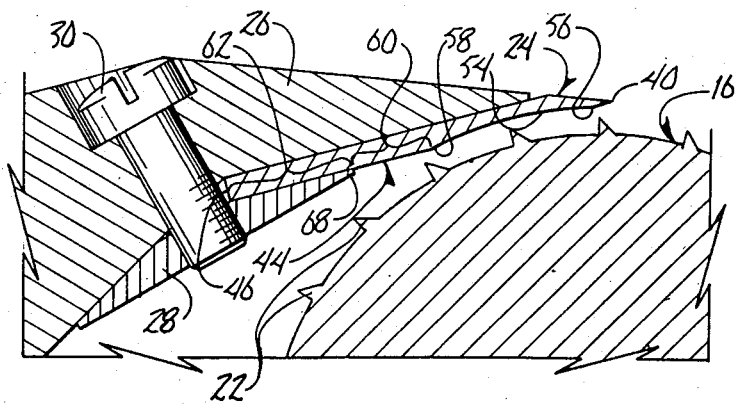
FIG. 3 is an enlarged sectional view of the blade holder, the blade and the gripping roll.

When skinning blade 24 is held by blade control mechanism 18, the shank portion 44 is positioned between the lower blade holder 28 and the upper blade holder 26 as shown in FIGS. 1 and 3. However, the extension portion 60 is exposed beyond the forward end 68 of lower blade holder 28. Thus, extension portion 60 provides a spacing between the rear edge 58 of concave surface 54 and the forward edge 68 of lower blade holder 28. This causes the forward edge 68 of lower blade holder 28 to be positioned remotely from the teeth 22 of the gripping roll 16 as those teeth rotate in a circular path.

The upper and lower blade holders 26, 28 hold the blade in a position such as shown in FIG. 3 with the concave surface 54 being positioned in close spaced concentric relation to the circular path of the teeth 22 on gripping roll 16. The upwardly beveled portion 52 of the lower surface of blade 24 causes the skin of the meat to be guided downwardly between the gripping roll and the concave surface 54. This facilitates a clean separation of the skin S from the meat M. The downwardly beveled surface 64 of blade 24 causes the meat to be moved upwardly away from the skin S, thereby further facilitating the separation of the meat from the skin.

In previous devices, a pressure shoe which comprised part of the lower blade holder 28 included a concave surface which provided the function of concave surface 54. However, the leading edge of prior pressure shoes often deteriorated because of the thin thickness thereof. The present invention prevents this from happening by making the concave surface 54 part of the skinning blade itself, and by positioning the forwardmost edge 68 of the lower holding member 28 remotely from the teeth 22 of the gripping roll. This edge 68 does not have to be machined to a feather edge, and it is not substantially subjected to wear because it is spaced from the periphery of the gripping roll 16. The concave surface 54 provides an even pressure on the skin so that the skin is pressed towards the teeth of the gripping roll so as to facilitate the separation of the skin from the meat.

The skinning blade of the present invention minimizes the accumulation of fat, skin or other tissue in the juncture point between the blade and the pressure shoe previously used. In the present invention there is no such juncture, and therefore the present invention minimizes the accumulation of these tissues. This contributes to the cleanliness of the device and provides a clean, even separation of the skin from the meat.

The present invention eliminates the need for the conventional pressure shoe such as used in prior devices, and therefore it also eliminates the necessity for tapering the arcuate portion of a conventional shoe to a feather-thin edge.

Thus, it can be seen that the device accomplishes at least all of its stated objectives.

What is claimed is:

1. A skinning blade, comprising,
   an elongated blade body having a top surface, a bottom surface, a forward cutting edge and a rearward edge,
   an elongated concave portion formed in the skinning blade and having forward and rearward ends, and being in spaced relation to the forward cutting edge and rearward edge of said skinning blade.

2. The blade of claim 1 wherein said top surface of said blade has a forward portion which is beveled downwardly and forwardly toward said cutting edge.

3. The blade of claim 2 wherein said rearward end of said concave surface is spaced from said rearward edge of said blade a distance which is substantially greater than the distance between said forward end of said concave surface and said cutting edge.

4. The blade of claim 3 wherein said bottom surface includes an upwardly beveled portion between said forward end of said concave surface and said cutting edge.

5. A meat skinning machine comprising:
   a supporting frame,
   a cylindrical gripping roll rotatably mounted on said frame, said gripping roll having an outer cylindrical surface provided with a plurality of teeth which move in a circular path during rotation of said gripping roll;
   blade support means mounted to said frame and positioned adjacent said gripping roll;
   an elongated skinning blade mounted to said blade support means and having a cutting edge positioned in close spaced relation to said outer cylindrical surface of said gripping roll,
   said skinning blade having upper and lower surfaces, and have a forward cutting edge and a rearward edge, and
   an elongated concave portion formed in said skinning blade, said concave portion being positioned in spaced relation to the forward cutting edge and the rearward edge of said skinning blade, and being positioned in approximate concentric relation to said cylindrical surface of said gripping roll.

6. The device of claim 6 wherein the distance between the rearward edge of said blade and said concave portion is substantially greater than the distance between said concave portion and said cutting edge.

7. The device of claim 6 wherein connecting means secure said blade to said blade support means rearwardly of said concave portion.

* * * * *